Aug. 19, 1958 E. A. HASS 2,848,112
FILTER APPARATUS
Filed March 31, 1953 3 Sheets-Sheet 2
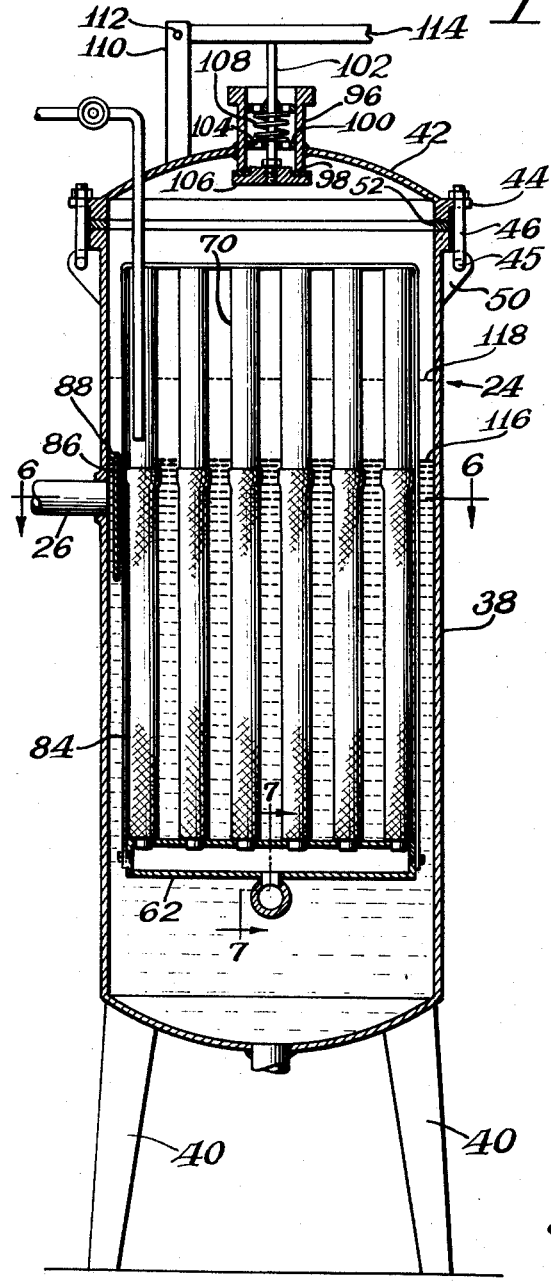
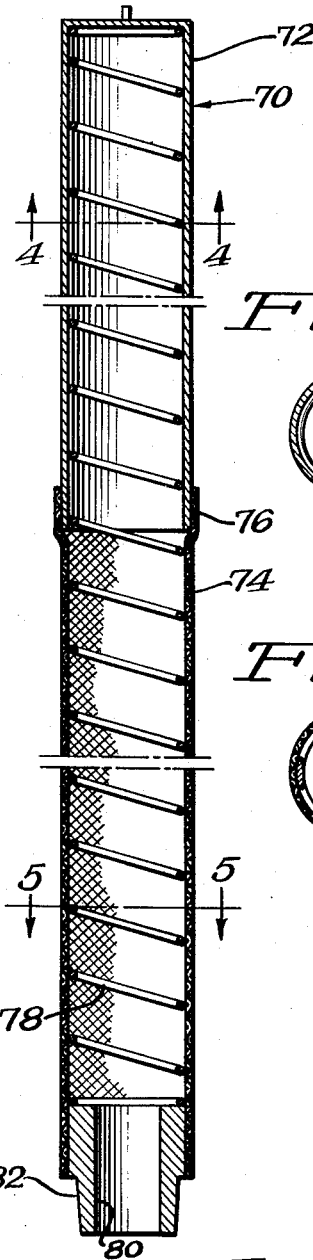
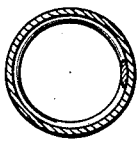
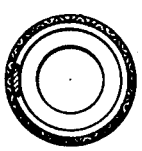
Inventor:
Ernst A. Hass
By Warren C. Horton
Atty.

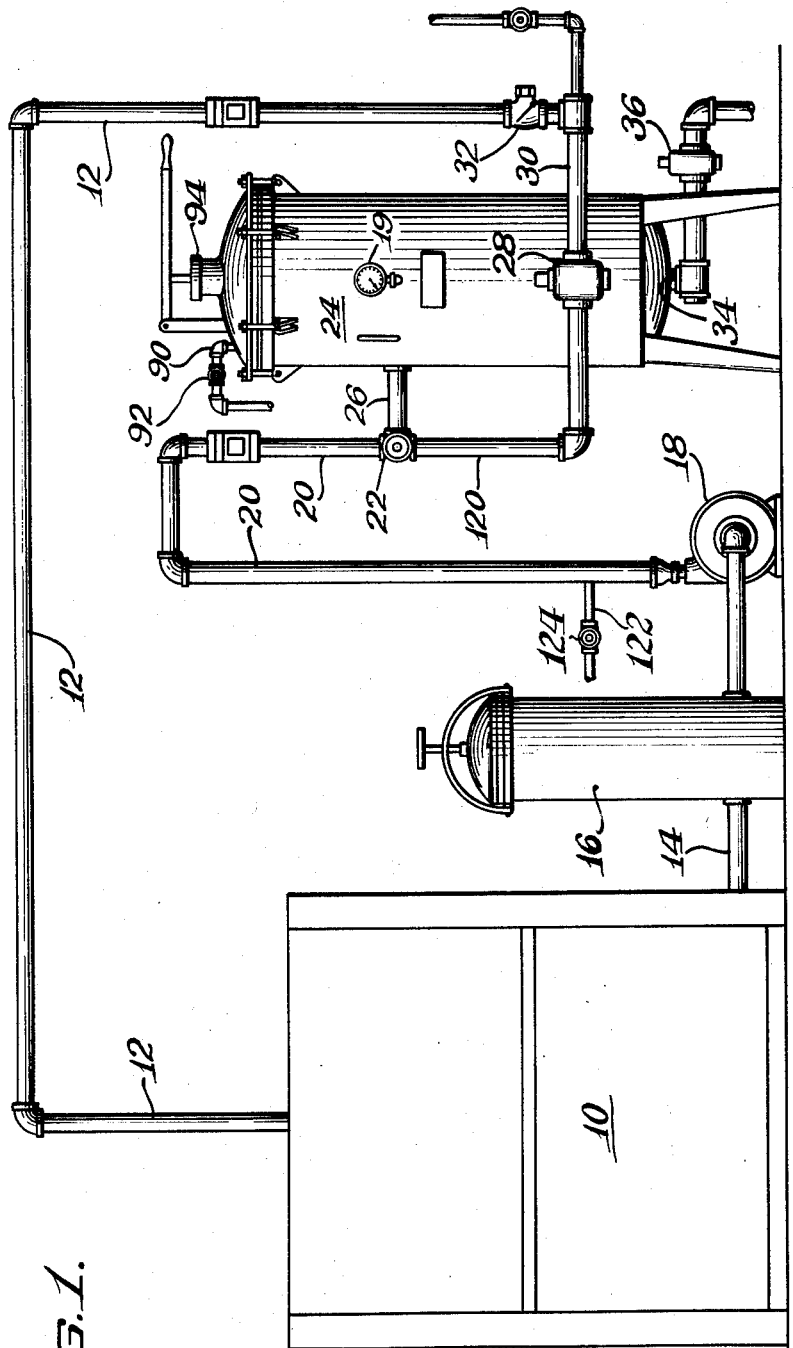

Aug. 19, 1958 E. A. HASS 2,848,112
FILTER APPARATUS
Filed March 31, 1953 3 Sheets-Sheet 3

Inventor:
Ernst A. Hass
By Warren C. Horton
Atty.

United States Patent Office 2,848,112
Patented Aug. 19, 1958

2,848,112

FILTER APPARATUS

Ernst A. Hass, Chicago, Ill.

Application March 31, 1953, Serial No. 345,767

6 Claims. (Cl. 210—333)

My invention relates to a filter apparatus and more particularly to a filtering element in such apparatus which possesses highly superior cleaning characteristics. Even more specifically it relates to that type of filtration process wherein the fluid to be filtered is drawn through a filter cake composed of such material as diatomaceous earth deposited on a fine mesh metal screen.

As a filter cake of this type is used over a period of time, it becomes dirty and requires replacement. The cake must be removed from the screen and disposed of in some convenient fashion and a new filter cake built up. A simple back-flushing is not enough. It may not dislodge the old cake, and even if it should do that, it is more than likely that the backflow will be only partially successful. A portion of the cake will be knocked off, but the screen uncovered by this portion will be adequate to handle reversed flow, so resulting in insufficient pressure to dislodge the rest of the cake. To meet the difficulty mechanism has been devised to deliver a sudden impact—a blow—to the filter cake similar in nature to the water hammer occurring when a faucet is suddenly shut off.

A common commercial form of filter embodying this principle has the actual filtering elements arranged in the form of a plurality of vertical tubes. These tubes are connected at their top ends to a plate which is situated in a filter housing, the tubes depending from the plate. Most of each tube consists of the screening, but at its upper end the screen is connected to a short length of solid tubing. The plate divides the housing into a lower influent chamber and an upper effluent chamber. In the course of operation, fluid is forced into the lower influent chamber to fill said chamber and cover entirely the screened area of the filter tubes. The fluid is forced through the filter cake built upon the outside of the tubes into the central part of the tubes and then rises above the carrying plate into the effluent chamber and flows off therefrom. The duct leading the fluid from the effluent chamber is substantially below the top thereof so that an air cushion exists above the level of the filtered fluid. In order to remove the filter cake from the tubular filtering screens, the duct from the effluent chamber is closed off while at the same time the circulating pump continues to supply liquid to the influent chamber which rises into the effluent chamber, putting the air cushion in the top of the latter chamber under materially increased pressure. The pump is stopped when the desired pressure is attained and a large air vent below the plate but above the level of the fluid in the influent chamber is suddenly opened. The air cushion suddenly expands to drive the liquid in the upper chamber and tubes through the screens to shatter loose the filter cake. Thereafter a backflow of the fluid may be used for a final cleaning of the screen, the old filter cake removed from the bottom of the influent chamber and a new filter cake built in the tubular filter screens.

There are several objections, however, to this arrangement. First, since the air cushion is common to all of the filter elements, if the cake on one particular filter element should by chance adhere more tightly than on the other elements, the dislodging of the cake from the other elements will be sufficient to vent the pressure of the air cushion and the one filter element will not be cleaned. A second disadvantage which inheres in this structure lies in the fact that the influent chamber must be vented for this cleaning operation. Therefore, not only must the filter housing itself be air-tight, but the two compartments within the housing must be air-tight with respect to each other. These requirements of hermetic seals introduce still another disadvantage of this structure in that the plate which carries all of the filter elements has a substantial pressure differential across it under normal filtering operation, and must be strong and consequently heavy. Consequently, the removal of the unit consisting of the plate and the filter elements for purposes of replacing, for instance, one of the elements, is difficult simply for this very reason of great weight.

This type of filter is known as an up-flow filter; that is, the fluid is admitted into the bottom portion of the tank and is drawn off from the upper portion. Hence, an ever-increasing concentration of dirt and sediment is built up in the lower part of the tank (particularly upon several cake depositions and removals), and the incoming fluid, in addition to carrying its normal load of contaminants, is further contaminated by the residual dirt in the influent chamber. This deficiency is particularly relevant in the case of the food industries.

The filter of my invention meets all of these objections successfully. Each filter has its own individual expansion or "shock" chamber. The hermetic requirements of my structure are far easier of accomplishment. There being no compartmentalizing of the filter housing, the weight of my structure is materially less; the structure is sectional in nature, and hence more easily removed, handled or adjusted than the above described type. Finally, my filter is a down-flow rather than an up-flow type with the attendant advantages of the liquid not circulating through or stirring up the sludge in the bottom of the filter chamber. Other objects and advantages will be apparent from the following description and drawings of which:

Fig. 1 is a diagrammatic representation of a system incorporating an embodiment of my filter, the representation being of a dry cleaning plant;

Fig. 2 is a vertical central section through the filter;

Fig. 3 is a vertical section of one of the tubular filter elements;

Fig. 4 is a section which may be regarded as being taken substantially along the line 4—4 of Fig. 3 looking in the direction of the arrows;

Fig. 5 is a section which may be considered as being taken substantially along the line 5—5 of Fig. 3 looking in the direction of the arrows;

Figure 6:
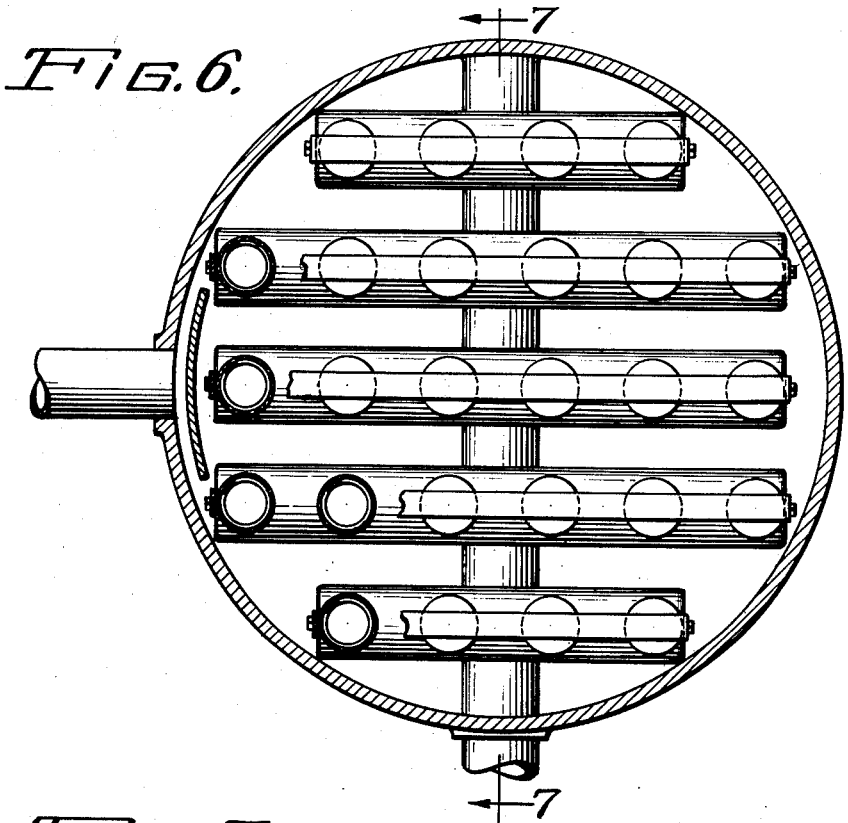
Fig. 6 is a section which may be considered as being taken substantially along the line 6—6 of Fig. 2 looking in the direction of the arrows.
Figure 7:
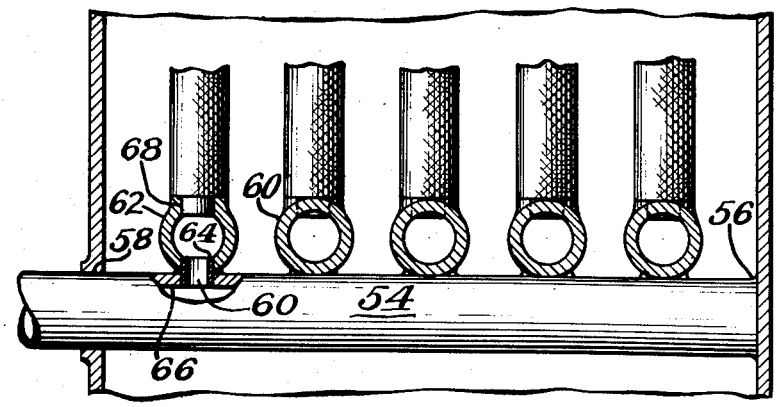
Fig. 7 is an enlarged side elevation of the filter outlet of my invention showing the manifolds thereof in section.

In Fig. 1 is shown somewhat schematically a cleaning plant which provides for a substantially continuous recirculation and filtering of the cleaning fluid. The fluid is introduced into a cleaning vat 10 by means of a duct 12. Fluid is drawn off from the bottom of the vat by an outlet duct 14 and passes into a sedimentation tank or trap 16 in which the grosser and heavier impurities are removed from the cleaning fluid. From the trap 16 it is delivered by means of a pump 18 and duct 20 to a valve 22 which during normal operation directs the fluid into the filter 24 through the inlet pipe 26. The fluid is filtered inside the filter 24 and after filtration emerges through the valve 28 to return to duct 12 via the pipe 30 and a check valve 32. The filter has on the bottom thereof a waste outlet 34 with a valve 36 therein which permits the dumping of the filter sediment including the old filter cakes as will later be described.

The interior of the filter 24 may be best seen in Fig. 2. It comprises a large cylindrical housing 38 which may stand on legs 40 secured to the housing in any suitable fashion. The housing has a hinged cover 42 detachably secured thereto by bifurcated ears 44 and clamps 46 pivotally secured as at 48 to ears 50 on the housing 38. A gasket material 52 is situated between the cover 42 and housing 38 to effect an air-tight seal therebetween. The most vital structural limitation on the housing and cover is that it must withstand the periodic application of high internal pressure as will be subsequently described.

Upwardly of the bottom of the tank, an outlet manifold 54 extends horizontally across the center of the tank and is supported at one end 56 to the tank wall and at the other end 58 extends through the wall of the housing to communicate with valve 28. This manifold is a tubular member and has a series of tapered inlet perforations 60 spaced along the upper surface thereof. A plurality of submanifolds 62 are situated in a horizontal plane on top of the manifold 54 and crosswise with respect thereto. The submanifolds have holes 64 formed in the bottom thereof carrying tubular sleeves 66 tapered to fit closely into the opening 60 of the manifold 54. The submanifolds 62 have in turn a plurality of tapered holes 68 on their upper surfaces.

The actual filtering is accomplished by means of the filter elements 70, the interior construction of which is shown in Fig. 3. These elements are generally tubular and consist of an upper elongated inverted cup 72 and a stainless steel twill weave screen 74 wrapped about the cup so as to form a tube and to overlie a small portion 76 of the open end of the cup 72. The cup and screen are secured together by welding or brazing. Likewise the vertical edges of the screen are seamed together in any appropriate fashion to define the tube. A long light spring 78 extending from the base of the cup to the open end of the screen is placed within the cup-screen tube in order to prevent the collapse of either of these elements under the influence of external pressure, and a tubular fitting 80 is inserted in the opposite end of the screen tube, the overlapping portion of the screen being again secured thereto in any suitable way. The fitting has a tapered outwardly extending surface 82 which fits in fluid-tight relation into the holes 68 in the submanifolds 62.

As will be seen in Fig. 6, the manifold 54 is furnished with five submanifolds 62 of which two carry four filter elements and three carry six filter elements. It is of course desirable that as much filtering surface as possible be provided within the housing 38 of the filter, and therefore the interior of the housing should be as densely packed with tubes as possible, considering the requirements of liquid flow, of filter cake space, of cake disposal, and of convenient arrangement of the filter elements. The elements 70 may be secured to their respective manifolds by straps 84 which may be detachably secured to the submanifolds 62 at their ends to extend upwardly therefrom and over the top of the set of filter elements 70. The filter elements may have small studs 85 on their tops which are accommodated in matching holes in the straps 84 to maintain the proper alignment of the elements.

Fig. 2 illustrates the entry of the inlet pipe 26 into the filter housing 38. A baffle 86 is secured to the interior wall of the housing 38 at 88 to deflect the flow of cleaning fluid downward and prevent undue agitation and bubble formation. The cover 42 of the filter has contained therein an air pressure relief tube 90 with a valve 92 therein and a large, hand-operated, pressure relief valve 94. The pressure relief valve consists of a valve housing 96 let into the surface of the cover 42 which provides at its inner end a valve seat 98 and a valve guide 100 which serves the purpose of guiding a valve stem 102 while at the same time providing for an exceedingly rapid pressure release through a plurality of large ports 104 therein. The valve stem 102 carries a valve 106 which is normally urged into engagement with the valve seat 98 by a spring 108. The cover may have an upstanding arm 110 situated close to the valve which provides the fulcrum 112 for a manually operated second order lever 114.

Under normal filtration, the pump 18 is forcing fluid through the inlet 26 to the interior of the filter housing 38. The normal level 116 of fluid in the housing is maintained above the open ends of the inverted cups 72. The tubular screen elements 74 are normally coated with a filter cake consisting of diatomaceous earth or some similar inert and finely divided material. The pressure of the pump and of the head of air above the surface 116 forces the fluid through the filter cake and the screen whence it flows downward through the tubular fitting 80 into the submanifolds 62 and from there into the main outlet manifold 54 to the valve 28. From this point, it is recirculated into the dry cleaning washer.

After a period of use, the filter cake will gradually become dirty and clogged and hence increasingly impervious to the flow of fluid therethrough resulting in excessive operating pressures. It is therefore desirable that the old filter cake be removed and a new one placed on the filtering elements. To accomplish this, the valve 28 is closed to prevent the exit of fluid from the main manifold 54. Due to the baffle 86 there has been a minimum of agitation of the fluid within the housing 38. As a consequence, the cups 72 have contained therein a head of air which extends substantially down to their mouths. As flow through the main manifold 54 is blocked, the pump 18 continues to deliver fluid into the housing 38. The level of fluid in the housing therefore rises to a level 118 which results in a major increase in pressure of the air under the domed cover 42, and most important, in the air cushion within the cups 72. When the desired pressure is reached, as may be read on a pressure gauge 19, the pump is shut off. The lever is then operated as suddenly as possible and the valve 106 thrown open to vent the pressure contained in the housing. This results in a sudden relief of pressure on the air cushions inside the cups 72 and their sudden expansion acting against the column of fluid contained inside the tubular screen elements and extending partially up into the cup constitutes a sort of shock analogous to a water hammer as when a water tap is suddenly turned off. This sudden driving of the fluid within the filter elements out through the screens is effective to dislodge and break up thoroughly the old filter cake surrounding each of the screens.

The old filter cake then falls between the submanifolds and past the main manifold to the bottom of the housing 38 where it may be drawn off through the waste outlet 34.

The screens may then be further washed by operating valve 22 to direct the fluid from the line 20 into the bypass pipe 120, the valve 28 being operated to place the line 120 in communication with the main manifold 54. This results in a reverse flow through the main manifold 54 into the submanifolds 62 and into the interior of the filter elements 70 and out through the screens 74 to remove any part of the filter cake which may still be lodged thereon.

To place the fresh filter cake on the filter elements 70, the cake material may be introduced into the sedimentation tank 16, the pump 18 and valves 22 and 28 being positioned for normal filtering operation. The cake material is thus directed by the pump through the pipe 20, the inlet 26 and into the filter housing wherein it is strained out of the fluid by the screens 74 and deposited thereon, the operation continuing until a filter cake of sufficient depth has been built up. In order to make an adequate filter cake, the fluid within the filter housing must be restored to its proper level 116 to compensate for whatever fluid may be lost through draining off the waste through the waste outlet 34. To do this, the valve 28 is closed and the pump is operated to admit fluid through inlet 26, the air pressure vent 90 being opened to permit a rise of the fluid level within the housing to the proper point without an attendant pressure building up.

The development of the high pressure within the housing 38 preliminary to dislodging the filter cake places greater demands on the pump 18 than the uninhibited circulation through the filter in normal filtering operations. These demands may, of course, be met by the use of a high pressure pump. Another possibility, however, which avoids the expense of a high pressure pump is to connect a source 122 of air under pressure with a valve shut-off 124 therein to the duct 20. It will be appreciated that the elevation of the liquid level inside the housing is not essential to the practice of my invention. Increase in pressure, however achieved, will accomplish the purpose of compressing the air inside the cups 72 and increase the total liquid volume contained inside the filtering elements 70, and the separate introduction of air under pressure through the connection 122 is an effective alternative. Likewise, it is desirable that somewhat higher pressure be available in the backwashing operation than for normal filtration and the same source 122 of air pressure having available ahead of it the liquid contained in the ducts 20 and 120 meets this requirement.

The purpose accomplished by the check valve 32 is that when the operation of the plant is interrupted such as at night or for the purpose of making repairs, there would normally be a backflow through the pipes 12 which would knock off the filter cake built up on the filtering elements. The check valve 32 prevents this backflow.

From the foregoing description, it will be seen that I have provided a filter which successfully avoids the objections indicated above in that instead of having an air cushion which is common to all of the tubular filtering elements, I have provided an air cushion which is individual to each of the tubular elements and therefore the dislodgment of a cake on one element cannot result in a pressure venting such that other more highly adherent filter cakes will not be shattered.

My concept avoids the use of a manifold plate and pressure differentials within the filter housing which complicates so greatly the construction and maintenance of the filter. By virtue of the uniform pressures within the housing there are no circumstances which would tend to distort or derange the components of the system, which therefore may be more lightly constructed and assembled.

It will be appreciated that I have illustrated and described but one embodiment of my invention in the specific application of a dry cleaning plant. Many alternatives will be evident both in the structural details described above and in the applications and usage of my filter. I therefore desire that my invention be regarded as limited only as set forth in the following claims.

I claim:

1. A liquid filter comprising a housing having an inlet thereto, a filter element in said housing having an air entrapping inverted cup in the upper end thereof and individual thereto and a liquid-permeable portion below said cup, an outlet from the lower end of said element extending to the exterior of said housing, said housing being adapted to hold liquid to cover the open end of said cup, means in said outlet to stop liquid flow therethrough, means for increasing pressure in said housing, and means for venting suddenly said increased pressure developed therein.

2. A liquid filter comprising a housing having an inlet thereto, a vertically arranged filter tube in said housing having a liquid-permeable screened portion and an open-ended, air entrapping enclosure individual to said tube communicating with said screened portion, said housing being adapted to hold liquid to cover the open end of said enclosure, an outlet from the lower end of said tube extending to the exterior of said housing, means in said outlet to stop liquid flow therethrough, means for increasing pressure in said housing and means for venting suddenly said increased pressure developed therein.

3. A filter comprising a housing having an inlet thereto, a vertically oriented filter tube in said housing having an inverted cup in the upper end thereof and a liquid-permeable portion below said cup, said housing being adapted to hold liquid to cover the open end of said cup, said permeable portion being adapted to have a filtering material deposited on the exterior thereof, an outlet from the lower end of said tube extending to the exterior of said housing, means for increasing pressure in said housing and means for venting suddenly said increased pressure.

4. A liquid filter comprising a housing having an inlet thereto, a filter tube in said housing having an inverted cup at the upper end thereof to entrap air therein, a liquid-permeable portion below said cup adapted to have a filtering material deposited on the exterior thereof, said housing being adapted to hold liquid to cover the open end of said cup, means to prevent the flow of filtered liquid from said tube, means for increasing the pressure in said housing to compress the air in said cup, and means for venting suddenly the pressure in said housing to cause a sudden expansion of the air in said cup.

5. A filter comprising a housing having an inlet thereto, and an outlet therefrom, a plurality of filter elements having air entrapping enclosures communicating therewith, means for connecting said filter elements to said outlet in communicating relation therewith, the permeable portions of said filter elements being adapted to have deposited thereon cakes of filtering material, means for maintaining the liquid level in said housing to trap air in said enclosures, means for increasing the pressure within said housing to compress the air within said enclosures and means for venting suddenly said increased pressure in said housing to permit an expansion of the air in said enclosures to drive the liquid contained in said elements through said permeable portions thereof to dislodge the filter cake from said permeable portions.

6. A filter comprising a housing having an inlet thereto, and an outlet therefrom, a plurality of tubular filter elements having air entrapping inverted cups at the upper ends thereof, and liquid-permeable portions below said cups and secured to the mouths thereof, means for connecting the lower ends of said filter elements to said outlet in communicating relation therewith, the permeable portions of said filter elements being adapted to have deposited thereon cakes of filtering material, means for maintaining the liquid level in said housing above the mouths of said cups, means for stopping liquid flow through said outlet, means for increasing the pressure within said housing to compress the air within said cups, and means for venting suddenly said increased pressure in said housing to permit an expansion of the air in said cup to drive the liquid column contained in said elements through said permeable portions to dislodge the filter cakes from said permeable portions.

References Cited in the file of this patent

UNITED STATES PATENTS

| | | |
|---|---|---|
| 1,771,928 | Jung | July 29, 1930 |
| 1,778,596 | Heibig | Oct. 14, 1930 |
| 2,013,776 | Wiesman | Sept. 10, 1935 |
| 2,108,798 | Dalrymple | Feb. 22, 1938 |
| 2,423,172 | Booth | July 1, 1947 |
| 2,468,603 | Pew | Apr. 26, 1949 |
| 2,519,663 | Klein | Aug. 22, 1950 |
| 2,562,730 | Miller | July 31, 1951 |
| 2,595,913 | Baily | May 6, 1952 |
| 2,600,458 | Ackley et al. | June 17, 1952 |